(12) United States Patent
Khanduja et al.

(10) Patent No.: US 9,667,725 B1
(45) Date of Patent: May 30, 2017

(54) PROVISIONING ISOLATED STORAGE RESOURCE PORTIONS FOR RESPECTIVE CONTAINERS IN MULTI-TENANT ENVIRONMENTS

(71) Applicant: EMC Corporation, Hopkinton, MA (US)

(72) Inventors: Vaibhav Khanduja, Cupertino, CA (US); Suresh Kumar, Sunnyvale, CA (US); Xiaohong Qin, Saratoga, CA (US); Ryan Wallner, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 173 days.

(21) Appl. No.: 14/820,026

(22) Filed: Aug. 6, 2015

(51) Int. Cl.
 *G06F 15/16* (2006.01)
 *H04L 29/08* (2006.01)
(52) U.S. Cl.
 CPC ................ *H04L 67/1097* (2013.01)
(58) Field of Classification Search
 CPC .................................................. H04L 67/1097
 See application file for complete search history.

(56) References Cited

U.S. PATENT DOCUMENTS

| 8,417,747 | B1 | 4/2013 | Hayden et al. |
| 8,898,402 | B1 | 11/2014 | Stronge |
| 8,954,787 | B2 * | 2/2015 | Gladwin ............ G06F 11/0727 714/4.1 |

(Continued)

FOREIGN PATENT DOCUMENTS

| CN | 103810046 A | 5/2014 |
| CN | 103870314 A | 6/2014 |
| CN | 104104513 A | 10/2014 |

OTHER PUBLICATIONS

A. Gulati et al., "mClock: Handling Throughput Variability for Hypervisor IO Scheduling," USENIX Symposium on Operating Systems Design and Implementation (OSDI), https://labs.vmware.com/academic/publications/mclock, Oct. 2010, 14 pages.

(Continued)

*Primary Examiner* — Moustafa M Meky
(74) *Attorney, Agent, or Firm* — Ryan, Mason & Lewis, LLP (57) ABSTRACT

An apparatus comprises at least one container host device implementing containers for respective tenants of a multi-tenant environment, a storage platform coupled to the container host device and implementing storage resources for utilization by the containers, and a container storage controller associated with the container host device. The container storage controller is configured to provision portions of the storage resources for respective ones of the containers including for each of the containers at least one virtual storage volume accessible only to that container and having an associated file system that is not visible to an operating system of the container host device. The provisioned portion of the storage resources for a given one of the containers of a corresponding one of the tenants is thereby isolated from the provisioned portions of the storage resources for respective other ones of the containers of corresponding other ones of the tenants.

20 Claims, 7 Drawing Sheets

(56) References Cited

U.S. PATENT DOCUMENTS

| | | | |
|---|---|---|---|
| 8,996,910 B2* | 3/2015 | Gladwin | G06F 11/0727 714/6.2 |
| 9,141,458 B2* | 9/2015 | Grube | G06F 11/0727 |
| 9,250,887 B2* | 2/2016 | Lucovsky | G06F 9/45533 |
| 9,298,550 B2* | 3/2016 | Gladwin | G06F 12/1408 |
| 2008/0256607 A1 | 10/2008 | Janedittakarn et al. | |
| 2012/0173488 A1 | 7/2012 | Spielberg et al. | |
| 2012/0174113 A1 | 7/2012 | Pohlmann | |
| 2012/0180039 A1 | 7/2012 | Bravery et al. | |
| 2012/0290868 A1* | 11/2012 | Gladwin | G06F 11/0727 714/4.1 |
| 2012/0290877 A1* | 11/2012 | Grube | G06F 11/0727 714/15 |
| 2012/0290878 A1* | 11/2012 | Gladwin | G06F 11/0727 714/20 |
| 2013/0145006 A1 | 6/2013 | Tammam | |
| 2014/0274408 A1 | 9/2014 | Dave | |
| 2014/0317618 A1 | 10/2014 | Behera et al. | |
| 2014/0366155 A1 | 12/2014 | Chang et al. | |
| 2015/0058861 A1 | 2/2015 | Zheng et al. | |
| 2015/0074058 A1 | 3/2015 | Zhao et al. | |
| 2015/0120928 A1 | 4/2015 | Gummaraju et al. | |
| 2015/0186214 A1* | 7/2015 | Gladwin | G06F 12/1408 714/766 |
| 2015/0370586 A1* | 12/2015 | Cooper | G06F 9/45533 710/308 |
| 2015/0378827 A1* | 12/2015 | Grube | G06F 11/0727 714/6.24 |
| 2016/0335129 A1* | 11/2016 | Behera | G06F 9/45558 |

OTHER PUBLICATIONS

U.S. Appl. No. 14/752,153, filed in the name of R. Wallner et al. on Jun. 26, 2015 and entitled "Coordinated Resource Allocation Between Container Groups and Storage Groups."

* cited by examiner

PROVISIONING ISOLATED STORAGE RESOURCE PORTIONS FOR RESPECTIVE CONTAINERS IN MULTI-TENANT ENVIRONMENTS

FIELD

The field relates generally to information processing systems, and more particularly to techniques for provisioning storage resources in information processing systems.

BACKGROUND

Information processing systems increasingly utilize reconfigurable virtual resources to meet changing user needs in an efficient, flexible and cost-effective manner. For example, cloud computing and storage systems implemented using virtual machines have been widely adopted. Alternative virtual resources now coming into use in information processing systems include Linux containers. Such containers may be used to provide at least a portion of the virtualization infrastructure of a given information processing system. However, significant challenges arise in deployment of containers in multi-tenant environments. For example, in such environments it can be difficult to isolate storage resources utilized by a container of one tenant from the storage resources utilized by containers of other tenants.

SUMMARY

Illustrative embodiments provide techniques for provisioning isolated portions of storage resources for different containers in a multi-tenant environment. Such arrangements facilitate the effective isolation of storage resources utilized by a container of one tenant from the storage resources utilized by containers of other tenants.

In one embodiment, an apparatus comprises at least one container host device implementing containers for respective tenants of a multi-tenant environment. The apparatus further comprises a storage platform coupled to the container host device and implementing storage resources for utilization by the containers, and a container storage controller associated with the container host device. The container storage controller is configured to provision portions of the storage resources for respective ones of the containers including for each of the containers at least one virtual storage volume accessible only to that container and having an associated file system that is not visible to an operating system of the container host device. The provisioned portion of the storage resources for a given one of the containers of a corresponding one of the tenants is thereby isolated from the provisioned portions of the storage resources for respective other ones of the containers of corresponding other ones of the tenants.

In some embodiments, the virtual storage volumes for respective ones of the containers are mounted using separate storage mount namespaces within the respective ones of the containers with the storage mount namespaces not being accessible to the operating system of the container host device.

Also, input/output (I/O) operations originated by an application running in the given one of the containers may utilize the file system of its corresponding virtual storage volume.

The container storage controller may illustratively comprise a container storage orchestration tool running as an application on the container host device.

As noted above, illustrative embodiments described herein provide significant improvements relative to conventional arrangements. For example, in some of these embodiments, difficulties associated with isolation of shared storage resources between multiple tenants are eliminated, leading to improved security and performance in an information processing system comprising a multi-tenant storage environment.

These and other illustrative embodiments described herein include, without limitation, methods, apparatus, systems, and processor-readable storage media.

DETAILED DESCRIPTION

Illustrative embodiments of the present invention will be described herein with reference to exemplary information processing systems and associated host devices, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as multi-tenant environments.

Figure 1:
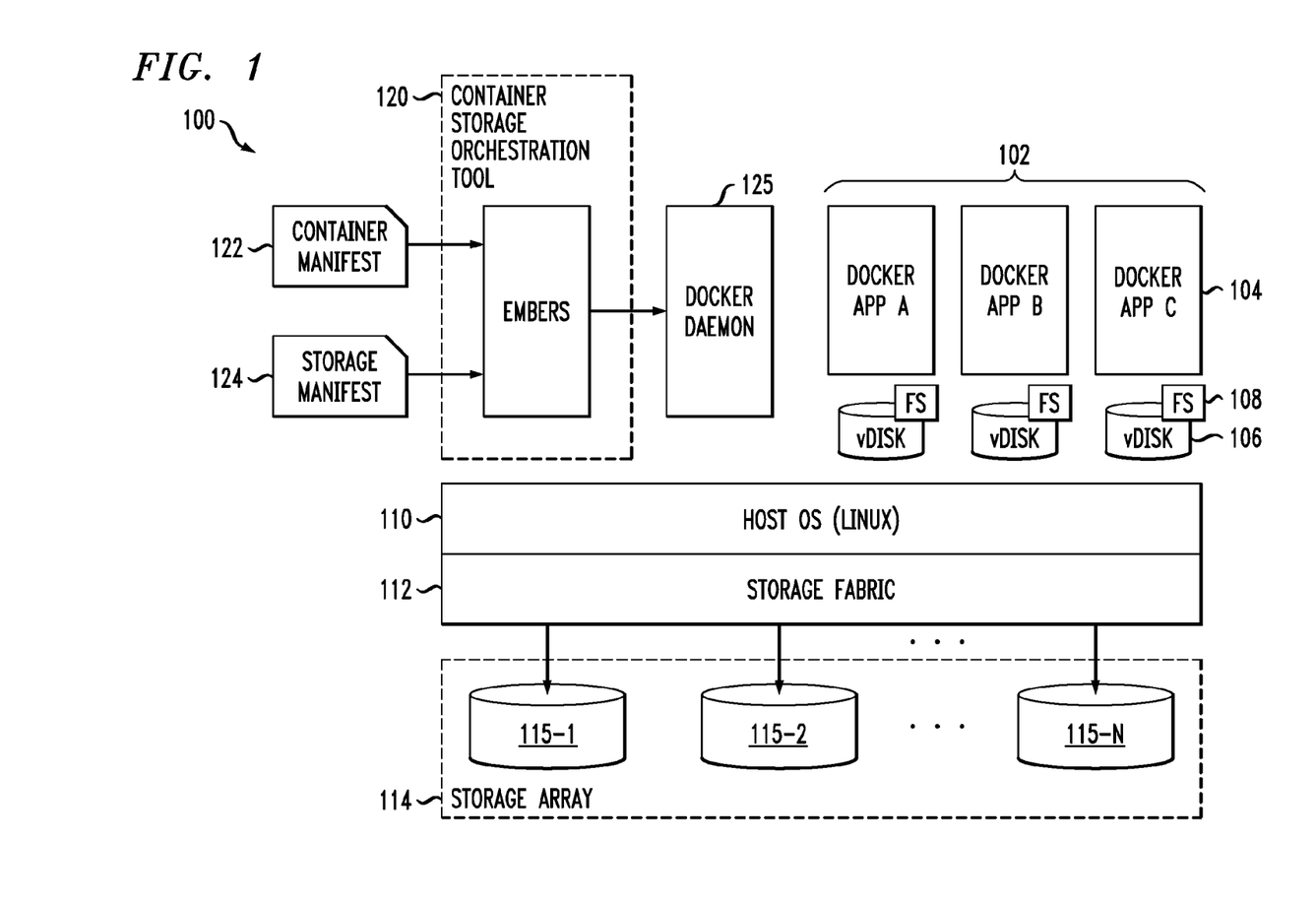
FIG. 1 shows an information processing system configured to provide isolated storage resource portions for containers of different tenants of a multi-tenant environment in an illustrative embodiment.

FIG. 1 shows an information processing system 100 configured in accordance with an illustrative embodiment. The system 100 comprises a plurality of containers 102 that are assumed to be implemented by at least one container host device. Each of the containers 102 comprises a corresponding application 104 that runs in that container, a virtual disk ("vDisk") 106, and an associated file system (FS) 108. The virtual disks 106 are examples of what are more generally referred to herein as "virtual storage volumes." In other embodiments, virtual storage volumes other than virtual disks may be used.

The containers 102 are assumed to be associated with respective tenants of a multi-tenant environment of the system 100, although in other embodiments a given tenant can have multiple containers. It will also be assumed for further description below that a single container host device implements all of the containers 102 of the FIG. 1 embodiment, although other embodiments can include multiple container host devices. Each of these container host devices illustratively comprises at least one processor coupled to a memory. Such host devices are examples of what are more generally referred to herein as "processing devices."

The containers 102 of the system 100 are illustratively implemented as respective Docker containers, but one of more of the containers in other embodiments can comprise other types of containers, such as other types of Linux containers (LXCs). It is therefore to be appreciated that embodiments of the present invention are not restricted to use with Docker containers or any other particular type of containers. The containers 102 are assumed to be implemented on the above-noted container host device using Linux kernel control groups ("cgroups").

The containers 102 may be utilized to implement a variety of different types of functionality within the system 100. For example, such containers can be used to implement platform-as-a-service (PaaS) or infrastructure-as-a-service (IaaS) functionality in system 100, as well as microservices or converged infrastructure within a data center or other cloud computing and storage system. More particularly, in the present embodiment, the containers 102 comprise respective Docker containers running respective Docker applications denoted A, B and C, with each such container and its associated application corresponding to a different tenant of the multi-tenant environment of system 100.

The tenants associated with the respective containers 102 in the FIG. 1 embodiment are also referred to herein as tenants A, B and C. Accordingly, Docker application A is run in a container of tenant A, Docker application B is run in a container of tenant B, and Docker application C is run in a container of tenant C.

In other embodiments, processes other than applications 104 can be run in the containers 102. By way of example, containers can be used to implement respective portions of one or more cloud compute nodes of a cloud computing system. Such compute nodes may be associated with respective cloud tenants.

The container host device that implements the containers 102 in the FIG. 1 embodiment has a host operating system (OS) 110 that illustratively comprises a Linux operating system. The container host device is coupled to a storage platform that implements storage resources for utilization by the containers 102. The storage platform in this embodiment comprises a storage fabric 112 coupled to a storage array 114. The storage array 114 comprises a plurality of storage volumes denoted 115-1, 115-2, . . . 115-N. Other embodiments can implement other types of storage platforms, such as storage platforms comprising only a storage array, or storage platforms that use a storage fabric without a storage array. As noted above, storage resources of the storage platform comprising storage fabric 112 and storage array 114 are utilized by the containers 102 of the respective tenants A, B and C.

The term "storage platform" as used herein is intended to be broadly construed so as to encompass at least one storage array, at least one storage fabric or a combination of multiple instances of one or more of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage products such as VNX® and Symmetrix VMAX®, both commercially available from EMC Corporation of Hopkinton, Mass. Other types of storage products that can be used in implementing a given storage platform in an embodiment of the present invention include SDS products such as ScaleIO™, scale-out all-flash storage arrays such as XtremIO™, as well as scale-out NAS clusters comprising Isilon® platform nodes and associated accelerators in the S-Series, X-Series and NL-Series product lines, all commercially available from EMC Corporation.

The system 100 further comprises a container storage orchestration tool 120 associated with the container host device that implements the containers 102. The container storage orchestration tool 120 is an example of what is more generally referred to herein as a "container storage controller." In the present embodiment, the container storage orchestration tool is assumed to be running as an application on the same container host device that implements the containers 102 for the respective tenants. By way of example, the container storage orchestration tool may run in its own container on the container host device, separate from the containers 102, although it need not run in a container. In some embodiments, the container storage orchestration tool 120 comprises at least one command-line interface (CLI) running on the container host device.

The container storage orchestration tool 120 is configured to provision portions of the storage resources of the storage platform for respective ones of the containers 102. The provisioned portions of the storage resources of the storage platform include for each of the containers 102 at least one virtual storage volume (e.g., a virtual disk 106) accessible only to that container and having an associated file system 108 that is not visible to operating system 110 of the container host device. The provisioned portion of the storage resources for a given one of the containers 102 of a corresponding one of the tenants A, B or C is thereby isolated from the provisioned portions of the storage resources for respective other ones of the containers 102 of corresponding other ones of the tenants.

In addition to the file system 108, the corresponding provisioned virtual storage volume (e.g., virtual disk 106) is also assumed to be not visible to the host operating system 110 of the host container device.

A given virtual storage volume and its associated file system are not "visible" to the operating system 110 of the host device in the present embodiment in that the host operating system 110 does not maintain or have access to information characterizing the virtual storage volume and its associated file system. This is achieved in the present embodiment at least in part by configuring the container storage orchestration tool 120 to control the provision of storage virtualization functionality for the containers 102, rather than utilizing the host operating system 110 of the container host device in providing such functionality. Other techniques for limiting visibility of a virtual storage volume and/or its associated file system to particular system components can be used in other embodiments.

The virtual storage volumes for respective ones of the containers 102 are mounted using separate storage mount namespaces within the respective ones of the containers, with the storage mount namespaces not being accessible to the operating system 110 of the container host device. I/O operations originated by the applications A, B and C running in the respective containers 102 utilize the respective file systems 108 of their corresponding virtual storage volumes (e.g., virtual disks 106). It should be noted in this regard that the symbol "/" as used in the I/O context herein is intended to be broadly construed as "and/or" and thus I/O operations may refer to input operations, output operations or both input and output operations. Other contexts use the symbol "/" in other ways, such as to denote a mounting point (e.g., /mnt) for a virtual disk or other virtual storage volume.

The container storage orchestration tool 120 is also configured to control starting and stopping of the containers 102, and to provide other functionality within the system 100 such as snapshotting and/or migration or other movement of the virtual storage volumes (e.g., virtual disks 106) of respective ones of the containers 102.

As a more particular example, the container storage orchestration tool 120 is illustratively configured to stop a given one of the containers, adjust its corresponding provisioned portion of the storage resources, and restart the given container with an updated virtual disk 106 and associated file system 108 configured to reflect the adjusted provisioned portion of the storage resources.

These and other features of the container storage orchestration tool 120 will be described in more detail below in conjunction with FIGS. 4-8.

It is assumed that that each of the virtual disks 106 as well as other types of virtual storage volumes have associated therewith a metadata mapping table or other suitable mapping functionality for translating logical addresses of data specified in I/O operations directed to the virtual storage volume to corresponding physical addresses in the underlying storage platform comprising storage fabric 112 and storage array 114. For example, any of a wide variety of address translation techniques can be used to support such mapping functionality. The mapping functionality can be provisioned, for example, in conjunction with provisioning of the corresponding virtual disk or other virtual storage volume under the control of the container storage orchestration tool 120.

In the FIG. 1 embodiment, the container storage orchestration tool 120 more particularly comprises an example tool referred to herein as "Embers." The tool is configured to receive as inputs for each of the containers a container manifest 122 for that container and a storage manifest 124 for that container. The container storage orchestration tool 120 is configured to identify a given container characterized by its container manifest and to provision the virtual disk 106 and associated file system 108 for the given container in accordance with the storage manifest 124 prior to starting the given container.

The manifests 122 and 124 may be implemented, for example, as respective files or other suitable arrangements of information characterizing various features of the corresponding container and its storage requirements. Accordingly, the term "manifest" as used herein is intended to be broadly construed.

It is also to be appreciated that the term "Embers" as used herein is an arbitrary name for an illustrative example of what is more generally referred to herein as a container storage orchestration tool and still more generally as a container storage controller. Features associated with the example Embers tool in illustrative embodiments need not be present in other embodiments. Also, a wide variety of different tools or other controller arrangements can be used in other embodiments.

The storage manifest 124 for the given container illustratively specifies one or more of storage volume size, storage type, deduplication property, protection mechanism and storage mount path for the virtual storage volume of that container, although it is to be appreciated that additional or alternative storage requirements of the container can be specified in the storage manifest 124. The underlying host storage could be of any type, as long as it supports the features described in the storage manifest 124.

Accordingly, in the present embodiment, the container storage orchestration tool 120 takes as input the storage manifest 124 describing the storage needs of a corresponding one of the containers 102 and provisions that storage to the container. The container is therefore orchestrated by the tool 120 with the storage resources described in the storage manifest. The storage manifest in this embodiment serves to describe all the storage needs of the container such that the tool 120 can provision that storage for the container. In some embodiments, the container storage orchestration tool 120 can adjust the provisioned storage resources relative to those requested in the storage manifest 124, for example, in order to accommodate potentially-conflicting storage demands of different tenants.

An example of a storage manifest 124 is as follows:
{
"Size":"10M",
"Type":"FS",
"Provision": "Thin",
"DataProperty": "Deduplicated",
"Protection": "Snapshot",
"ContainerPath": "/mnt"
}

The storage manifest 124 in this example generally describes various requirements of the desired virtual storage volume, including its size (10 Megabytes or "10M"), type (File System or "FS"), provision ("Thin"), data property ("Deduplicated"), protection mechanism ("Snapshot") and its mount location inside the container ("ContainerPath"). Again, if the desired requirements cannot be fully accommodated at provisioning time, the container storage allocation tool 120 can provide an alternative provisioning that attempts to satisfy the requirements to the extent possible given the currently available storage resources of the storage platform.

The container manifest 122 is illustratively defined using Docker specifications based on the application. An example of a container manifest for a container implementing an application comprising a Cassandra database node is as follows:
{
"AttachStdin":false,
"AttachStdout":true,
"Tty":false,
"detach":true,
"OpenStdin":false,
"StdinOnce":false,
"Env":null,
"Image":"tobert/cassandra",
"Volumes":{
"/data": { }
},
"WorkingDir":" ",
"ExposedPorts":{
"7000/tcp": { },
"7199/tcp": { },
"9042/tcp": { },
"61621/tcp": { }
}
}

The particular example manifests 122 and 124 shown above are presented for purposes of illustration only and should not be construed as limiting in any way.

The container storage orchestration tool 120 controls the containers 102 via at least one Docker daemon 125. The Docker daemon is a tool provided by Docker to create containers using Linux cgroups and associated namespaces. The container storage orchestration tool 120 can communicate with the Docker daemon 125 via at least one application programming interface (API) which may comprise a RESTful API possibly in combination with one or more additional APIs of other types. The container storage orchestration tool 120 can also interface to the storage platform via one or more APIs.

In the FIG. 1 embodiment, the container storage orchestration tool 120 creates the virtual disks 106 for the respective containers 102 based on their respective manifests 122 and 124. The virtual disks 106 are created on top of host storage illustratively comprising storage fabric 112 and storage array 114. However, each virtual disk is mounted directly inside its corresponding container using the appropriate container mount namespace so as to provide no visibility of the virtual disk to other containers of other tenants. The tool 120 is configured so as to ensure that there are no references to such virtual disk storage mount points in the host operating system 110 of the container host device. For example, any such references can be removed from, or otherwise prevented from occurring in, the operating system 110 under the control of the tool 120. Accordingly, the virtual disks 106 and their associated files systems 108 are not visible to the operating system 110 of the container host device.

As noted above, the tool 120 manages the starting and stopping of the containers 102 as well as the provisioning and connection of their respective virtual disks 106 and file systems 108. In conjunction with starting or restarting of a given one of the containers 102, the container is connected with its corresponding one of the virtual disks 106, for example, during an initialization portion of the container starting or restarting process. If the storage needs of the given container have changed since its last run, the container storage orchestration tool 120 can extend or shrink the size of the virtual disk of the given container. For example, an existing virtual disk of the given container can be extended by daisy chaining a differencing virtual disk to a previously-provisioned virtual disk. In addition, protection functionality such as "cold" or "warm" snapshotting of the virtual disk can be provided, again in conformance with the requirements specified in the storage manifest 124.

The container storage orchestration tool 120 is illustratively implemented as a dedicated application for provisioning storage resource portions to respective ones of the containers 102 in accordance with their respective storage manifests 124. The storage manifests 124 may be specified at least in part by the applications associated with the respective containers. For example, the storage manifests may comprise storage resource requirement specifications for the respective containers.

As mentioned previously, the container storage orchestration tool 120 provisions the virtual disk 106 and associated file system 108 for each of the containers so that those resources are accessible only to that container. The tool utilizes a Linux mount namespace to mount the virtual storage volume to the container in an isolated manner. The virtual storage volume is not visible to the host operating system of the container host device and is exclusively accessible to the corresponding container to the exclusion of the other containers. All I/O operations by the application running in the container are directed to the file system 108 associated with the corresponding virtual disk 106.

The container storage orchestration tool 120 connects a given one of the containers 102 with its provisioned portion of the storage resources before starting that container. It maintains records of the provisioned portion of the storage resources for each container, including at least a subset of the above-noted storage manifest requirements, such as storage volume size, as well as additional or alternative storage resource information such as logical units (LUNs), NAS devices, mirrors and their respective configurations.

The container storage orchestration tool 120 provides a number of significant advantages. For example, it avoids the need for the containers 102 to rely upon the container host device for storage virtualization. In an arrangement in which the container host device provides storage virtualization for the containers running on that device, it can be very difficult if not impossible to provide adequate isolation between the virtual storage resources of the different tenants in a multi-tenant environment. For example, a malicious tenant associated with one container may be able to access data of another tenant associated with another container in an arrangement in which the container host device provides storage virtualization for both containers. In addition, such arrangements generally cannot support portability or movement of virtual storage resources of an individual container. Illustrative embodiments address these and other issues by orchestrating containers with provisioned storage resources as specified in their respective storage manifests. This is achieved while ensuring that a given provisioned virtual storage volume and its associated file system are accessible only to its corresponding container and that there is no visibility of the virtual storage volume and its associated file system in the container host device operating system.

Another advantage of the illustrative embodiments is improved scalability by avoiding excessive amounts of file metadata on the host file system. File system segregation is achieved by mounting the virtual disk using a separate file system that is not part of the host file system metadata. As a result, any scalability or corruption issues relating to the host file system do not adversely impact container virtual storage volumes.

In addition, expandability of the storage resources is facilitated, as are various data protection mechanisms such as snapshotting and/or migration or other movement of virtual storage volumes. For example, containers and their respective virtual storage volumes can be easily moved from one container host device to another. Illustrative embodiments also facilitate fair allocation of resources in a multi-tenant environment.

Although shown as being separate from the storage platform in the FIG. 1 embodiment, the container storage orchestration tool 120 can in some embodiments be implemented at least in part within the storage platform, or on at least one processing device that implements at least a portion of the storage platform. Numerous other arrangements of processing devices can be used to implement the containers 102, container storage orchestration tool 120, and associated container host device and storage platform elements.

Accordingly, it is to be appreciated that the particular arrangement of system elements shown in FIG. 1 is for purposes of illustration only, and that other arrangements of additional or alternative elements can be used in other embodiments.

Figure 2:
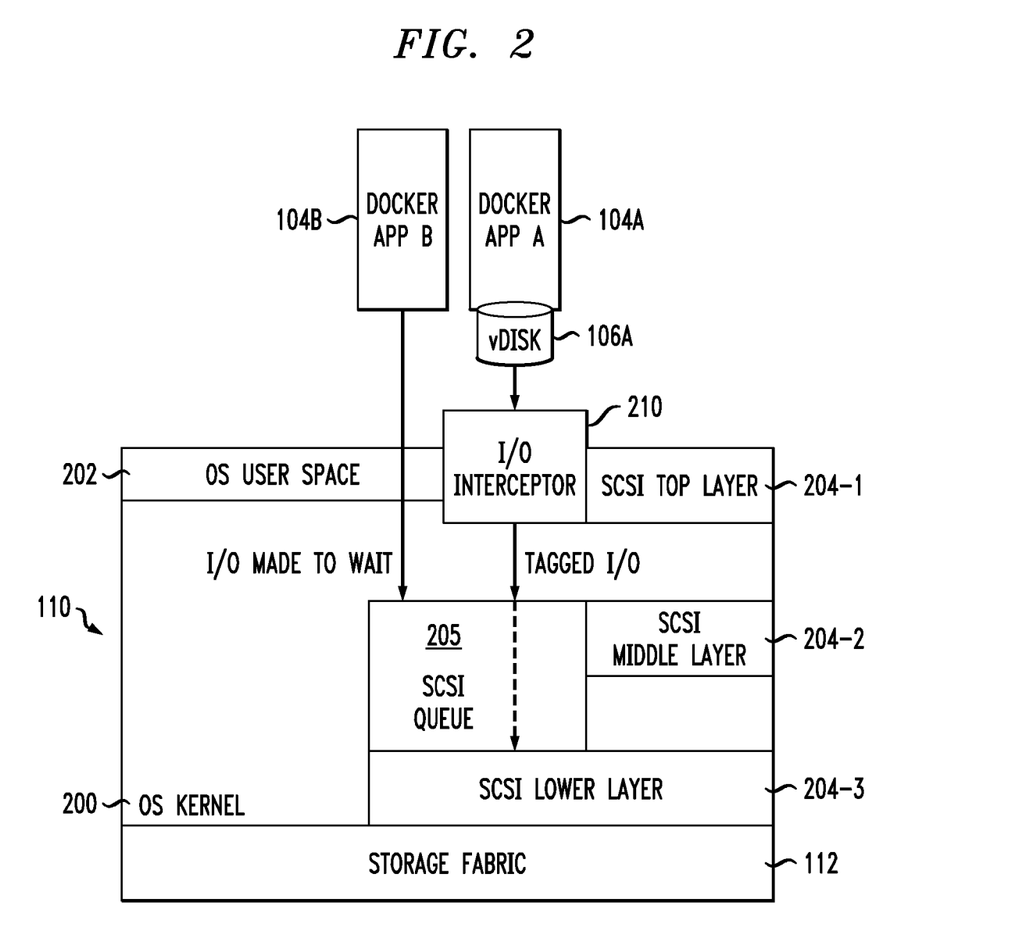
FIG. 2 shows a more detailed view of part of the information processing system of FIG. 1.

Referring now to FIG. 2, part of the information processing system 100 of FIG. 1 is shown in more detail in an illustrative embodiment. It is to be appreciated that other implementations of the system 100 need not include the particular additional features illustrated in the FIG. 2 embodiment.

FIG. 2 illustrates that the host operating system 110 of the container host device in FIG. 1 more particularly comprises an OS kernel 200 and an OS user space 202. Also associated with the host operating system 110 are small computer system interface (SCSI) components including a SCSI top layer 204-1, a SCSI middle layer 204-2, a SCSI lower layer 204-3 and a SCSI queue 205. These SCSI components 204 and 205 are illustratively part of the container host device that includes the host operating system 110. Other types and arrangements of physical storage access components can be used in other embodiments.

Docker applications 104A and 104B running in respective ones of the containers 102 access underlying storage resources via the SCSI components and the storage fabric 112. In this embodiment, a particular one of the containers, namely the container that includes Docker application 104B, has its I/O operations prioritized for access to its corresponding provisioned portion of the storage resources, relative to the I/O operations of other containers such as the container that includes Docker application 104A.

This is achieved in the FIG. 2 embodiment through the use of an I/O interceptor 210 that is illustratively controlled by the container storage orchestration tool 120. In this embodiment, the I/O operations relating to the virtual disk 106A of Docker application 104A are tagged by the I/O interceptor 210 for prioritized access to the provisioned portion of the underlying storage resources. The I/O tagging provided by I/O interceptor 210 can be implemented using a disk filter driver, configured to tag all intercepts coming from the Docker application 104A, in conjunction with appropriate adjustment of scheduling rules in the SCSI queue 205. Thus, for example, tagged I/O operations from Docker application 104A are passed through the SCSI queue 205 with prioritized access to the SCSI lower layer 204-3, as indicated by the dashed vertical arrow, while other I/O operations such as those from Docker application 104B are made to wait in the SCSI queue 205.

The I/O interceptor 210 in the FIG. 2 embodiment is implemented as a separate component relative to the container storage orchestration tool 210. The I/O interceptor 210 is illustratively installed within the system 100 along with the tool 210.

Prioritized access arrangements such as that illustrated in FIG. 2 can be used to ensure fair resource availability in a multi-tenant environment. As indicated above, such an arrangement allows I/O operations originating from an individual container to be tagged for identification so as to prioritize them over operations originating from other containers. A tenant in need of higher storage bandwidth for its corresponding container can thereby be provided with prioritized access relative to the containers of other tenants. The prioritization can vary over time as the needs of the particular tenants change.

Again, the particular arrangements of components shown in the embodiments of FIGS. 1 and 2 are presented by way of example only. Numerous alternative system configurations can be used to implement provisioning of isolated portions of storage resources for different containers of respective tenants in a multi-tenant environment.

Figure 3:
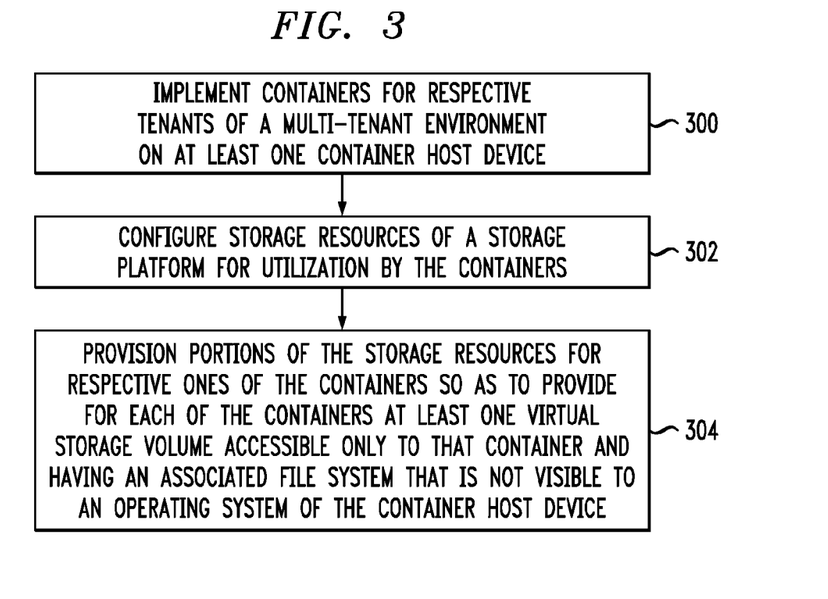
FIG. 3 is a flow diagram of a process for providing isolated storage resource portions for containers of different tenants of a multi-tenant environment in an illustrative embodiment.

The operation of an illustrative embodiment of an information processing system will now be described in further detail with reference to the flow diagram of FIG. 3. The process as shown includes steps 300 through 304.

In step 300, containers are implemented for respective tenants of a multi-tenant environment on at least one container host device. The containers are assumed to be implemented on a single container host device. Such an arrangement was assumed for the containers 102 in the FIG. 1 embodiment. As mentioned previously, the containers illustrative comprise Docker containers or other types of Linux containers.

In step 302, storage resources of a storage platform are configured for utilization by the containers. For example, the storage resources can be configured on a storage platform comprising at least one storage array 114 as in the FIG. 1 embodiment.

In step 304, portions of the storage resources are provisioned for respective ones of the containers so as to provide for each of the containers at least one virtual storage volume accessible only to that container and having an associated file system that is not visible to an operating system of the container host device.

Additional details regarding the FIG. 3 process will be described below in conjunction with FIGS. 4-6. These figures detail example algorithms providing at least a portion of the functionality of the container storage orchestration tool 120 or other type of container storage controller in illustrative embodiments.

Figure 4:
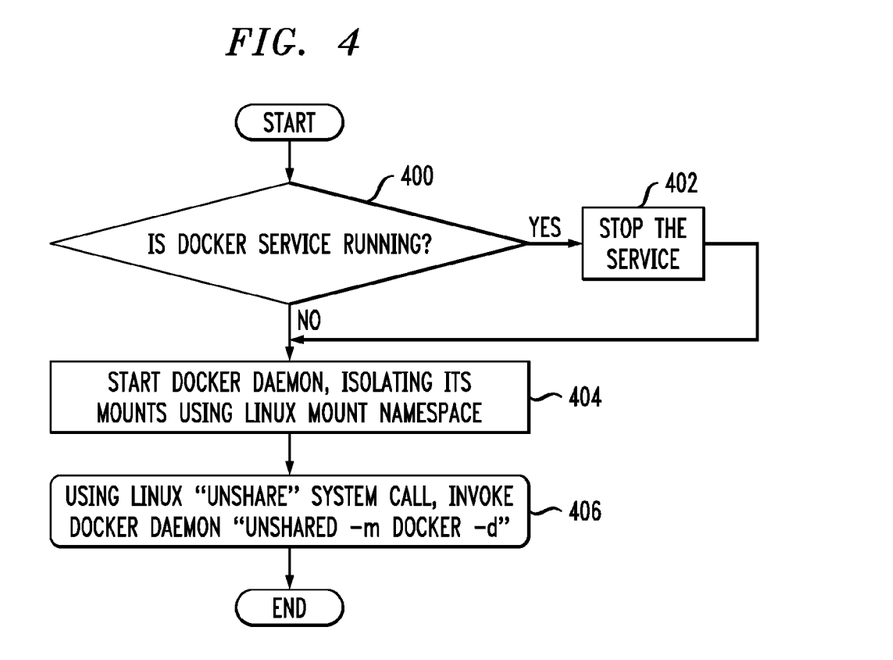
FIGS. 4, 5 and 6 are flow diagrams of respective processes implemented by a container storage orchestration tool in an illustrative embodiment.
Figure 5:
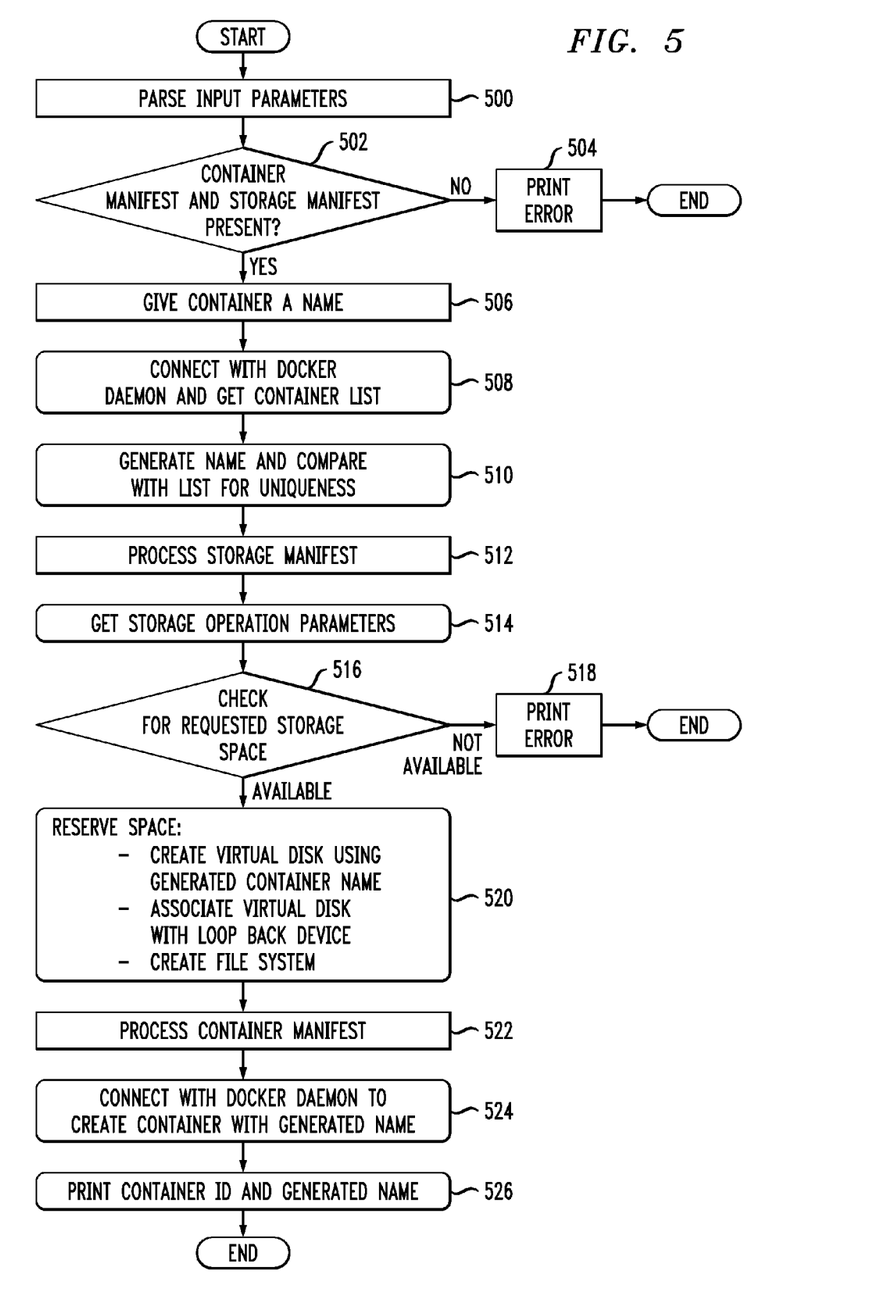
Figure 6:
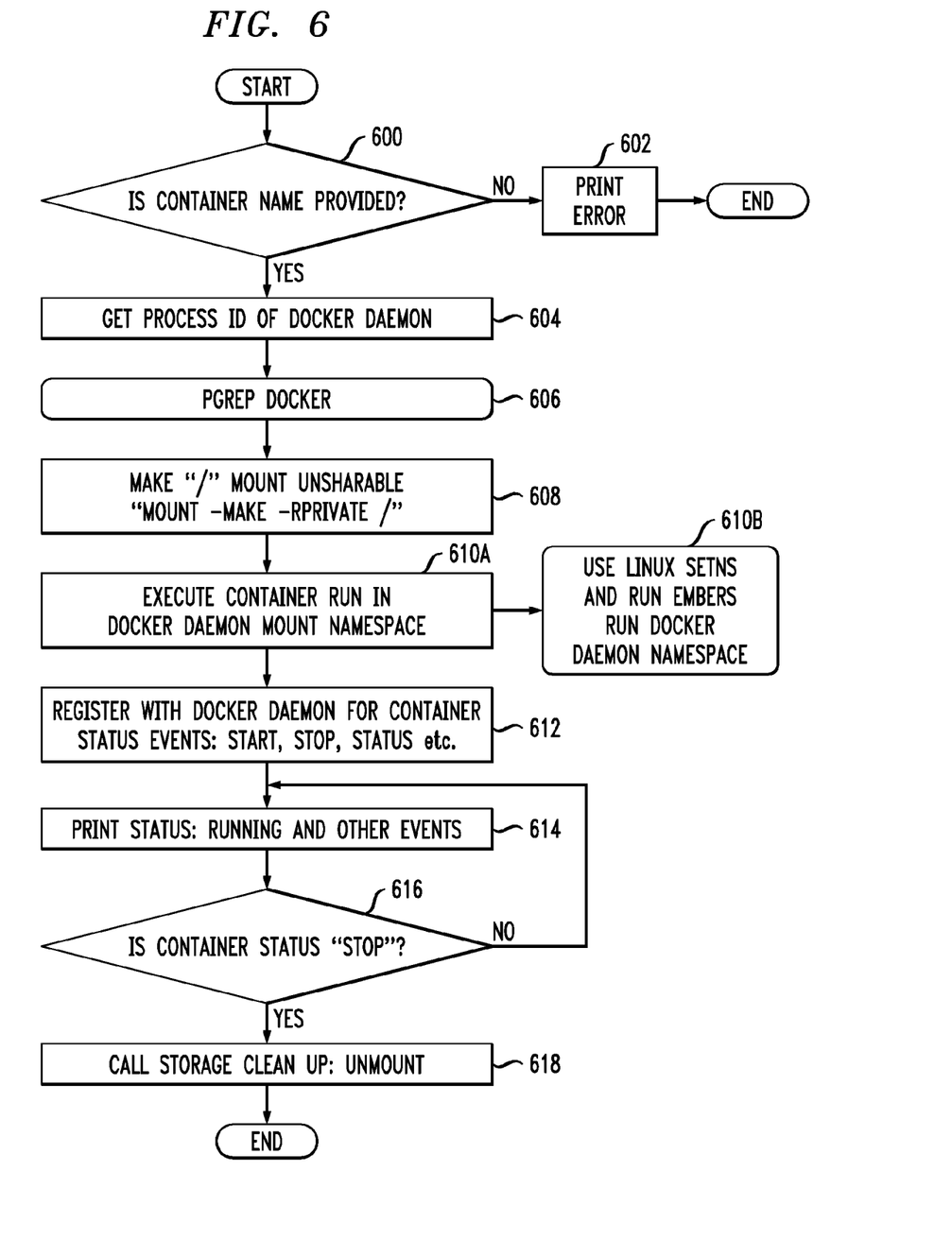

In the embodiments to be described in conjunction with the flow diagrams of FIGS. 4-6, the container storage orchestration tool 120 is assumed to be implemented using the above-noted Embers tool, although additional or alternative arrangements can be used in other embodiments. The Embers tool is illustratively written in the Go programming language ("Golang"). The inputs to the Embers tool are assumed to include the container manifest 122 and storage manifest 124 for each container as previously described.

The Embers tool further provides certain selectable processing options, such as an option of "-c" to create a container including a virtual disk and associated file system or an option of "-r" to run a container application.

For the create option, the Embers tool creates a virtual disk associated with the corresponding container, possibly under a user home directory, with a unique identifiable name. The virtual disk is converted into a block device using a loop back device driver, also sometimes referred to as a loop device driver, where the loop back device or loop device is a pseudo-device utilized to make a file system accessible as a block device. A file system is then created for the loop back device, and is mounted inside the target container namespace. Instead of the loop back device driver, any other block device driver which can read the format of the virtual disk can be used to create and mount the file system.

The container is started using the connecting Docker daemon 125 through its RESTful API which may be a publically-available API. The Embers tool makes use of the QCOW2 virtual disk format and associated QEMU commands such as qemu-img, where QCOW denotes QEMU Copy On Write and QEMU denotes Quick Emulator, although other formats and associated virtualization techniques may be used.

FIGS. 4, 5 and 6 show respective processes for isolation of Docker daemon 125, creation of a given one of the containers 102, and execution of a given one of the containers 102. These processes are part of the Embers tool that comprises an illustrative example of the container storage orchestration tool 120 of FIG. 1.

Referring initially to FIG. 4, the process for isolation of the Docker daemon 125 includes steps 400 through 406 as shown. At the start of the process, a determination is made in step 400 as to whether or not a Docker service provided by the Docker daemon 125 is running. If it is running, the Docker service is stopped in step 402. The process then moves to step 404, either from step 402 or from a negative determination in step 400. In step 404, the Docker daemon 125 is started in a manner that isolates its mounts using the Linux mount namespace. In step 406, the Linux "unshare" system call is used to invoke the Docker daemon 125, using the call format "unshared -m docker -d" as indicated. The process then ends.

FIG. 5 shows the process for creating one of the containers 102. This process includes steps 500 through 526 as shown. At the start of the process, input parameters including the processing option -c noted above are parsed in step 500, followed by a determination in step 502 as to whether or not container manifest 122 and storage manifest 124 are present. If one or more of these manifests 122 and 124 are not present, the process generates an error indication in step 504 and the process ends. This error indication generation is denoted by a "print error" function in step 504.

If it is determined in step 502 that both the container manifest 122 and the storage manifest 124 are present, the process moves to step 506 to initiate naming of the container being created. This further involves connecting with the Docker daemon 125 in step 508 to get a list of existing containers and then in step 510 generating the container name and comparing it with the list for uniqueness.

After a unique name has been established for the container being created, the processing of the storage manifest 124 is initiated in step 512. This further involves getting the storage operation parameters in step 514 and checking for requested storage space in step 516. If it is determined in step 516 that the requested storage space is not available, the process generates an error indication in step 518 using the print error function and then ends. If it is determined in step 516 that the requested storage space is available, the space is reserved in step 520 by creating a virtual disk using the generated container name, associating the virtual disk with a loop back device and creating a file system for the loop back device.

The processing of the container manifest 122 is then initiated in step 522. This further involves connecting with the Docker daemon 125 to create a container with the generated name in step 524, and then outputting the container identifier ("container ID") and generated name via a print function in step 526, after which the process ends.

FIG. 6 shows the process for executing one of the containers 102. This process includes steps 600 through 618 as shown. At the start of the process, a determination is made in step 600 as to whether or not a container name is provided. If the container name is not provided, an error indication is generated in step 602 using the print error function and then the process ends. Otherwise, the process initiates obtaining of the process identifier ("process ID") of the Docker daemon 125 in step 604. This further involves using the pgrep docker command in step 606. The "/" mount is made unsharable in step 608 through the "mount -make -rprivate /" command as indicated.

In step 610A, the container run is executed in the Docker daemon mount namespace. This illustratively involves using Linux setns, run embers and run docker daemon namespace commands in step 610B as indicated. In step 612, the container is registered with the Docker daemon 125 for container status events such as start, stop and other status events.

In step 614, the process generates output using a "print status" function to indicate that the container is running and to indicate any other events. The process then monitors for a container stop event in step 616. If no stop event is detected, the process returns to step 614. Otherwise the process moves to step 618 to call a "storage clean-up" function that involves unmounting the provisioned virtual disk, and then ends as indicated. The monitoring operation of step 616 can be repeated periodically or substantially continuously while the container is running.

The particular processing operations and other system functionality described in conjunction with the flow diagrams of FIGS. 3-6 are presented by way of illustrative example only, and should not be construed as limiting the scope of the invention in any way. Alternative embodiments can use other types of processing operations involving provisioning of isolated portions of storage resources of a storage platform for different containers of respective tenants of a multi-tenant environment. For example, the ordering of the process steps may be varied in other embodiments, or certain steps may be performed concurrently with one another rather than serially. Also, one or more of the process steps may be repeated periodically for different processing scenarios, or performed in parallel with one another. For example, parallel instantiations of one or more of the process steps can be implemented for different containers of respective tenants within the system.

Container storage controller functionality such as that described in conjunction with the flow diagrams of FIGS. 3-6 can be implemented at least in part in the form of one or more software programs stored in memory and executed by a processor of a processing device such as a computer or server. For example, the container storage orchestration tool 120 is illustratively implemented as a software tool configured to run on underlying hardware of a container host device. As will be described below, a memory or other storage device having executable program code of one or more software programs embodied therein is an example of what is more generally referred to herein as a "processor-readable storage medium."

Additional features of container storage orchestration tools in illustrative embodiments will now be described with reference to FIGS. 7 and 8.

Figure 7:
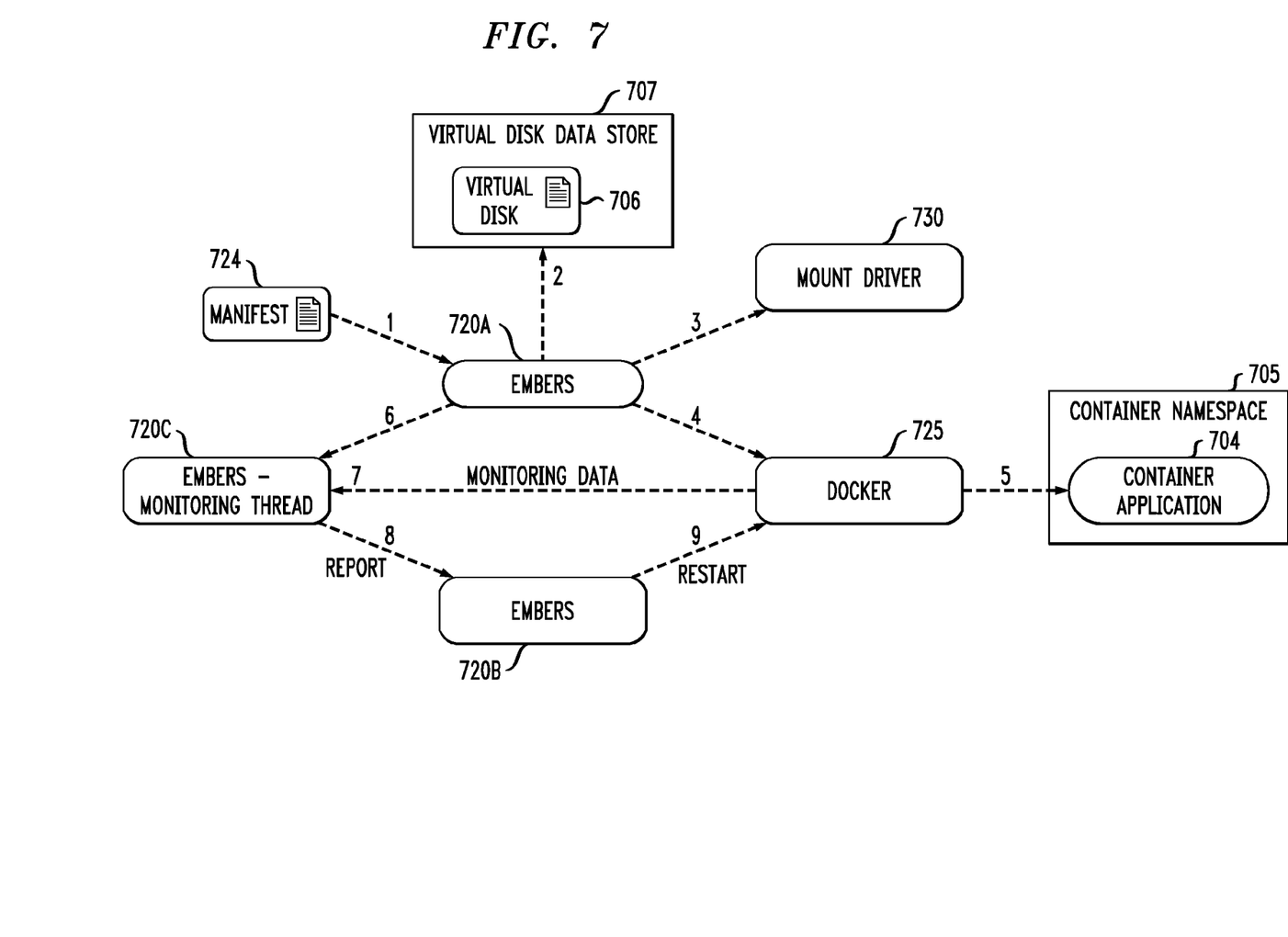
FIGS. 7 and 8 are diagrams illustrating respective processes involving a container storage orchestration tool in other embodiments.

Referring now to FIG. 7, a process includes steps labeled 1 through 9 as indicated. The process involves use of container storage orchestration tool 120 illustratively comprising the above-described Embers tool, and more particularly different parts 720A, 720B and 720C of the Embers tool. The Embers part 720A receives a storage manifest 724 at step 1 and processes the manifest to configure a virtual disk 706 in a virtual disk data store 707 at step 2. This illustratively involves use of an associated mount driver 730 at step 3 and creation of a corresponding file system.

The Embers part 720A interfaces with Docker daemon 725 at step 4 in order to run a container application 704 in a container namespace 705 at step 5. It also calls at step 6 the Embers part 720C that includes a monitoring thread. The Embers part 720C monitors container data in step 7 via the Docker daemon 725 and reports to the Embers part 720B in step 8. Results of this monitoring eventually cause a restart command to be directed from the Embers part 720B to the Docker daemon 725 as indicated in step 9.

Additional or alternative steps can be used in this example process, and some intermediate steps similar to certain steps of the flow diagrams of FIGS. 4-6 are omitted for simplicity and clarity of illustration.

Figure 8:
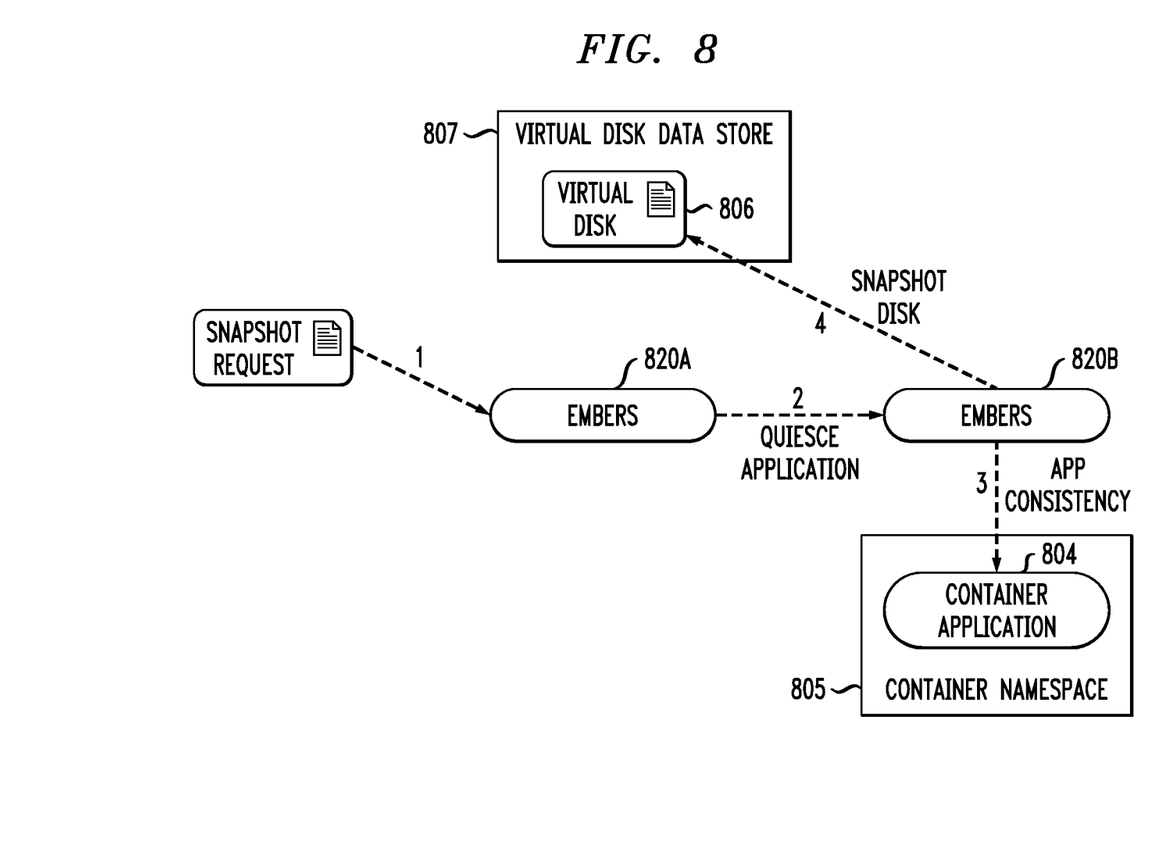

The FIG. 8 process includes steps labeled 1 through 4 and relates to generating a snapshot of a virtual disk 806 of a given container. The virtual disk 806 is part of a virtual disk data store 807. A snapshot request is received by an Embers part 820A at step 1 and processed by that part at step 2 in order to generate a request to another Embers part 820B to quiesce a container application 804 in a container namespace 805. The Embers part 820B in step 3 checks consistency of the container application 804. The Embers part 820B then takes a snapshot of the virtual disk 806 as indicated in step 4.

It should again be noted that the particular arrangements of components in the systems of FIGS. 7 and 8, like those of the system 100 of FIGS. 1 and 2, are presented by way of illustrative example only, and should not be construed as limiting in any way. As noted above, the described processes can be varied to include additional or alternative steps. Moreover, as mentioned previously, references herein to "Embers" refer to an illustrative example of a container storage orchestration tool, and a wide variety of different tool or controller implementations can be used in other embodiments.

The illustrative embodiments described above provide significant advantages over conventional arrangements.

For example, as indicated above, some embodiments avoid the need for the containers to rely upon the container host device for storage virtualization, thereby facilitating provision of adequate isolation between the virtual storage resources of the different tenants in a multi-tenant environment.

Additional advantages outlined elsewhere herein include improved scalability, data protection, container migration or other movement, and fairness in storage resource allocation.

As some embodiments of the invention address storage isolation drawbacks of conventional Docker implementations, these embodiments make Docker containers more suitable for use in multi-tenant environments. However, the disclosed arrangements are also applicable to other types of LXCs or containers generally.

It should be understood that the particular sets of modules and other components implemented in the information processing systems as described above are presented by way of example only. In other embodiments, only subsets of these components, or additional or alternative sets of components, may be used, and such components may exhibit alternative functionality and configurations. For example, numerous alternative multi-tenant environments can be provided comprising multiple containers utilizing respective isolated portions of underlying storage resources of a storage platform.

Also, the particular processing operations and other system functionality described in conjunction with the diagrams of FIGS. 1 through 8 are presented by way of illustrative example only, and should not be construed as limiting the scope of the invention in any way. Alternative embodiments can use other types of processing operations involving other information processing system components.

It is to be appreciated that functionality such as that described in conjunction with the diagrams of FIGS. 1 through 8 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally comprise other virtualization infrastructure such as virtual machines implemented using a hypervisor. Such cloud infrastructure can therefore be used to provide what is also referred to herein as a multi-tenant environment.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Such information processing system components can communicate with other system components over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems, multi-tenant environments, containers, storage resources and container storage controllers that can benefit from efficient provision of isolated storage resources to containers of respective tenants. Also, the particular configurations of system and device elements shown in FIGS. 1, 2, 7 and 8 and the processing operations in FIGS. 3-6 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
    at least one container host device implementing containers for respective tenants of a multi-tenant environment;
    a storage platform coupled to the container host device and implementing storage resources for utilization by the containers; and
    a container storage controller associated with the container host device;
    wherein the container storage controller is configured to provision portions of the storage resources for respective ones of the containers including for each of the containers at least one virtual storage volume accessible only to that container and having an associated file system that is not visible to an operating system of the container host device;
    the provisioned portion of the storage resources for a given one of the containers of a corresponding one of the tenants thereby being isolated from the provisioned portions of the storage resources for respective other ones of the containers of corresponding other ones of the tenants.

2. The apparatus of claim 1 wherein the container host device comprises at least one processor coupled to a memory and wherein at least a portion of the container storage controller is implemented by the processor executing software stored in the memory.

3. The apparatus of claim 1 wherein the storage platform comprises at least one of a storage fabric and a storage array.

4. The apparatus of claim 1 wherein the virtual storage volumes for respective ones of the containers are mounted using separate storage mount namespaces within the respective ones of the containers with the storage mount namespaces not being accessible to the operating system of the container host device.

5. The apparatus of claim 1 wherein the virtual storage volumes comprise respective virtual disks.

6. The apparatus of claim 1 wherein input/output operations originated by an application running in the given one of the containers utilize the file system of its corresponding virtual storage volume.

7. The apparatus of claim 1 wherein input/output operations originated by an application running in the given one of the containers are tagged for prioritized storage access to the provisioned portion of the storage resources relative to input/output operations originated by applications running in respective other ones of the containers.

8. The apparatus of claim 1 wherein the container storage controller comprises a container storage orchestration tool running as an application on the container host device.

9. The apparatus of claim 1 wherein the container storage controller is configured to control starting and stopping of the containers.

10. The apparatus of claim 1 wherein the container storage controller is configured to receive as inputs for each of the containers a container manifest for that container and a storage manifest for that container.

11. The apparatus of claim 10 wherein the container storage controller is configured to identify the given container characterized by the container manifest and provision the virtual storage volume and associated file system for the given container in accordance with the storage manifest prior to starting the given container.

12. The apparatus of claim 10 wherein the storage manifest for the given container specifies one or more of storage volume size, storage type, deduplication property, protection mechanism and storage mount path for the virtual storage volume of that container.

13. The apparatus of claim 1 wherein the container storage controller is configured to stop the given one of the containers, adjust its corresponding provisioned portion of the storage resources, and restart the given container with an updated virtual storage volume and associated file system configured to reflect the adjusted provisioned portion of the storage resources.

14. The apparatus of claim 1 wherein the container storage controller is configured to perform at least one of snapshotting and migration of the virtual storage volumes of respective ones of the containers.

15. An information processing system comprising the apparatus of claim 1.

16. A method comprising:
    implementing containers for respective tenants of a multi-tenant environment on at least one container host device;
    configuring storage resources of a storage platform for utilization by the containers; and
    provisioning portions of the storage resources for respective ones of the containers including for each of the containers at least one virtual storage volume accessible only to that container and having an associated file system that is not visible to an operating system of the container host device;
    the provisioned portion of the storage resources for a given one of the containers of a corresponding one of the tenants thereby being isolated from the provisioned portions of the storage resources for respective other ones of the containers of corresponding other ones of the tenants;
    wherein the implementing, configuring and provisioning are performed by at least one processing device comprising a processor coupled to a memory.

17. The method of claim 16 wherein the provisioning further comprises mounting the virtual storage volumes for respective ones of the containers using separate storage mount namespaces within the respective ones of the containers with the storage mount namespaces not being accessible to an operating system of the container host device.

18. The method of claim 16 further comprising:
stopping the given one of the containers;
adjusting its corresponding provisioned portion of the storage resources; and
restarting the given container with an updated virtual storage volume and associated file system configured to reflect the adjusted provisioned portion of the storage resources.

19. A non-transitory processor-readable storage medium having stored therein program code of one or more software programs, wherein the program code when executed by at least one processing device causes the processing device:
to implement containers for respective tenants of a multi-tenant environment on at least one container host device;
to configure storage resources of a storage platform for utilization by the containers; and
to provision portions of the storage resources for respective ones of the containers including for each of the containers at least one virtual storage volume accessible only to that container and having an associated file system that is not visible to an operating system of the container host device;
the provisioned portion of the storage resources for a given one of the containers of a corresponding one of the tenants thereby being isolated from the provisioned portions of the storage resources for respective other ones of the containers of corresponding other ones of the tenants.

20. The processor-readable storage medium of claim 19 wherein the virtual storage volumes for respective ones of the containers are mounted using separate storage mount namespaces within the respective ones of the containers with the storage mount namespaces not being accessible to the operating system of the container host device.

* * * * *

UNITED STATES PATENT AND TRADEMARK OFFICE
CERTIFICATE OF CORRECTION

| | |
|---|---|
| PATENT NO. | : 9,667,725 B1 |
| APPLICATION NO. | : 14/820026 |
| DATED | : May 30, 2017 |
| INVENTOR(S) | : Vaibhav Khanduja et al. |

It is certified that error appears in the above-identified patent and that said Letters Patent is hereby corrected as shown below:

In the Specification

Column 9, Line 44, please delete "tool 210" and replace it with --tool 120--

Column 9, Line 46, please delete "tool 210" and replace it with --tool 120--

Column 10, Lines 6 and 7, please delete "illustrative" and replace it with --illustratively--

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*